(12) United States Patent
Okada et al.

(10) Patent No.: US 12,249,131 B2
(45) Date of Patent: Mar. 11, 2025

(54) MODEL GENERATING APPARATUS AND MODEL GENERATING METHOD

(71) Applicant: DENSO TEN Limited, Kobe (JP)

(72) Inventors: Yasutaka Okada, Kobe (JP); Ryusuke Seki, Kobe (JP); Yuki Katayama, Kobe (JP); Rei Hiromi, Kobe (JP); Aoi Ogishima, Kobe (JP)

(73) Assignee: DENSO TEN Limited, Kobe (JP)

( * ) Notice: Subject to any disclaimer, the term of this patent is extended or adjusted under 35 U.S.C. 154(b) by 390 days.

(21) Appl. No.: 17/639,836

(22) PCT Filed: Sep. 23, 2020

(86) PCT No.: PCT/JP2020/035861
§ 371 (c)(1),
(2) Date: Mar. 2, 2022

(87) PCT Pub. No.: WO2022/064575
PCT Pub. Date: Mar. 31, 2022

(65) Prior Publication Data
US 2022/0415032 A1  Dec. 29, 2022

(51) Int. Cl.
*G06V 10/82* (2022.01)
*G06V 10/77* (2022.01)
*G06V 10/778* (2022.01)

(52) U.S. Cl.
CPC .......... *G06V 10/82* (2022.01); *G06V 10/7715* (2022.01); *G06V 10/778* (2022.01)

(58) Field of Classification Search
CPC .... G06V 10/764; G06V 10/82; G06V 10/774; G06V 20/56; G06V 10/25; G06V 10/40; G06V 10/761; G06V 10/771; G06V 10/776; G06V 10/80; G06V 20/20; G06V 20/52; G06V 2201/03; G06V 30/10; G06V 30/224
USPC ........................................................ 382/157
See application file for complete search history.

(56) References Cited

U.S. PATENT DOCUMENTS

2021/0089841 A1*  3/2021  Mithun ..................... G06T 7/90

FOREIGN PATENT DOCUMENTS

| JP | 2002-8033 A | 1/2002 |
|---|---|---|
| JP | 2019-515376 A | 6/2019 |

OTHER PUBLICATIONS

Oct. 27, 2020 International Search Report issued in International Application No. PCT/JP2020/035861.

\* cited by examiner

*Primary Examiner* — Ajibola A Akinyemi
(74) *Attorney, Agent, or Firm* — Oliff PLC

(57) ABSTRACT

A model generating apparatus includes a measurement unit and a change unit. The measurement unit measures a size of an object appearing on an image included in data set. The change unit changes, based on a distribution of the size, a layer to be connected to a detection unit of a Convolutional Neural Network (CNN) for detecting an object appearing on the image, among layers for extracting feature included in the CNN.

5 Claims, 12 Drawing Sheets

| TAG ID | VEHICLE ID | CAPTURING DATE AND HOUR | INFERENCE RESULT | ... |
|---|---|---|---|---|
| T01 | A01 | 2020/8/19 12:23 | PEDESTRIAN | ... |
| T02 | A01 | 2020/8/19 12:25 | AUTOMOBILE | ... |
| T11 | A02 | 2020/8/19 12:27 |  | ... |
| T12 | A02 | 2020/8/19 12:30 | CAT | ... |
| ⋮ | ⋮ | ⋮ | ⋮ | ⋮ |

202b

MODEL GENERATING APPARATUS AND MODEL GENERATING METHOD

CROSS-REFERENCE TO RELATED APPLICATIONS

This application is national stage application of International Application No. PCT/JP2020/035861, filed on Sep. 23, 2020, which designates the United States, the entire contents of which are incorporated herein by reference.

FIELD

The present disclosure is directed to a model generating apparatus and a model generating method.

BACKGROUND

Conventionally, in an object recognizing method with the use of Convolutional Neural Network (CNN), there has been proposed an artificial intelligence model (AI model) in which a plurality of detectors is prepared for each size of objects on an image (see Japanese Unexamined Patent Application Publication (Translation of PCT Application) No. 2019-515376, for example).

SUMMARY

Technical Problem

However, in the conventional technology, a detector to be used is fixed, and thus a configuration of a model does not match data of a detection target so as to reduce detection performance in some cases.

Solution to Problem

In order to solve the above-mentioned problem and to achieve the objectives, a model generating apparatus according to the present disclosure includes a measurement unit and a change unit. The measurement unit measures a size of an object appearing on an image included in a data set. The change unit changes, based on a distribution of the size, a layer to be connected to a detection unit of a Convolutional Neural Network (CNN) for detecting an object appearing on the image, among layers for extracting feature included in the CNN.

DESCRIPTION OF EMBODIMENTS

Hereinafter, an embodiment of a model generating apparatus and a model generating method will be described in detail with reference to the accompanying drawings. Moreover, the disclosed technology is not limited to the embodiment described below.

(Generation Apparatus)

Figure 1:
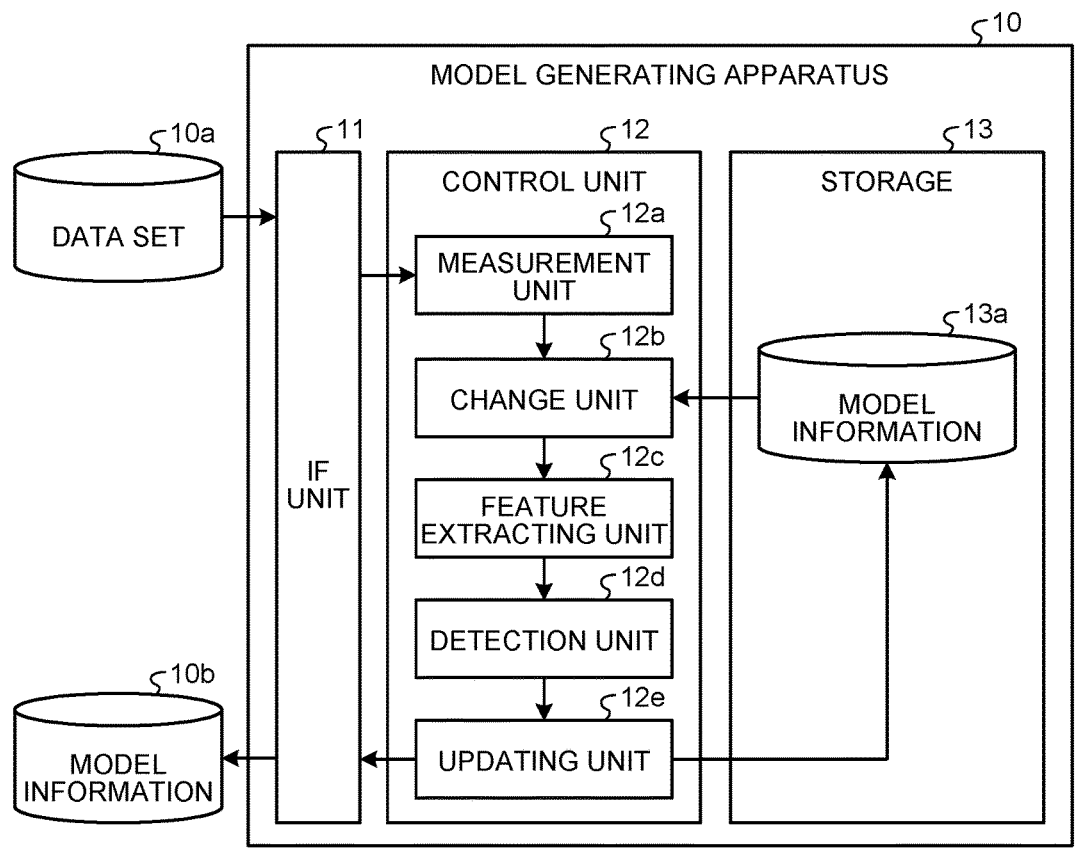
FIG. 1 is a block diagram illustrating a configuration example of a model generating apparatus according to an embodiment.

FIG. 1 is a block diagram illustrating a configuration example of a model generating apparatus according to the embodiment. As illustrated in FIG. 1, a model generating apparatus 10 receives input of a data set 10*a* so as to generate and update model information 13*a* that is information related to a model.

The model generating apparatus 10 may output information similar to the model information 13*a* as model information 10*b*.

The data set 10*a* is combination among a plurality of images and labels associated with objects appearing on the images. The model information 10*b* includes parameters for constructing an already-learned model and the like.

In the model generating method according to the embodiment, the model generating apparatus 10 measures a size of an object appearing on an image included in the data set 10*a*.

In the model generating method according to the embodiment, the model generating apparatus 10 changes, on the basis of a size distribution (distribution of size), a layer to be connected to a detection unit of CNN for detecting an object appearing on the image, among layers for extracting feature included in the CNN.

Thus, according to the present embodiment, a configuration of a model is able to be dynamically changed in accordance with an image to be detected.

As illustrated in FIG. 1, the model generating apparatus 10 includes an IF unit 11, a control unit 12, and a storage 13.

The IF unit 11 is an interface for inputting/outputting data. The IF unit 11 may be an interface for data communication such as a Network Interface Card (NIC), or may be an interface that is connected to an input device and an output device.

The control unit 12 and the storage 13 of the model generating apparatus 10 are realized by a computer including a Central Processing Unit (CPU), a Read Only Memory (ROM), a Random Access Memory (RAM), a flash memory, an input/output port, etc.; and various circuits.

For example, a CPU of the computer reads and executes a program stored in a ROM so as to function as a measurement unit 12a, a change unit 12b, a feature extracting unit 12c, a detection unit 12d, and an updating unit 12e of the control unit 12.

Moreover, at least one or all of the measurement unit 12a, the change unit 12b, the feature extracting unit 12c, the detection unit 12d, and the updating unit 12e may be constituted of hardware such as an Application Specific Integrated Circuit (ASIC) and a Field Programmable Gate Array (FPGA).

The storage 13 corresponds to a RAM and/or a flash memory. The RAM and the flash memory are capable of storing therein information such as the model information 13a and various programs.

The model generating apparatus 10 may acquire the above-mentioned programs and various kinds of information via another computer connected thereto with a wired/wireless network or a portable recording medium.

The model information 13a includes information on parameters for constructing a model using CNN and the like.

Figure 2:
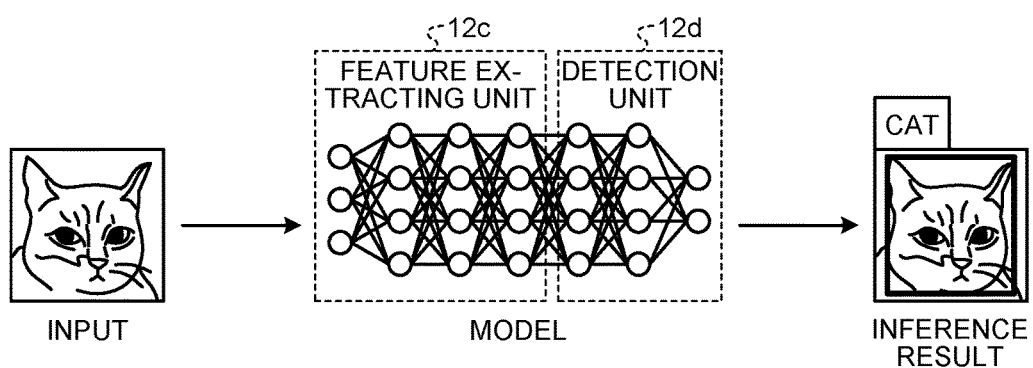
FIG. 2 is a diagram illustrating a model.

FIG. 2 is a diagram illustrating a model. As illustrated in FIG. 2, a model calculates a score of likelihood for each label with respect to an object appearing on an image, so as to output a label whose score is the maximum. In the example illustrated in FIG. 2, a model outputs a label of a cat with respect to the input image.

The model realizes calculation by using the feature extracting unit 12c and the detection unit 12d. In other words, the feature extracting unit 12c and the detection unit 12d execute calculation in accordance with the constructed model. Details of the feature extracting unit 12c and the detection unit 12d will be mentioned later.

Returning to FIG. 1, the control unit 12 includes the measurement unit 12a, the change unit 12b, the feature extracting unit 12c, the detection unit 12d, and the updating unit 12e.

The measurement unit 12a measures a size of an object appearing on an image included in a data set. For example, the measurement unit 12a measures a size of a bounding box, which is obtained from a predetermined process with respect to the image, as a size of the object.

The bounding box is a rectangular shape that indicates a region in which an object appears on an image. Thus, a size reference is unified regardless of a shape of an object. Moreover, a bounding box may be manually provided, or may be automatically provided.

Figure 4:
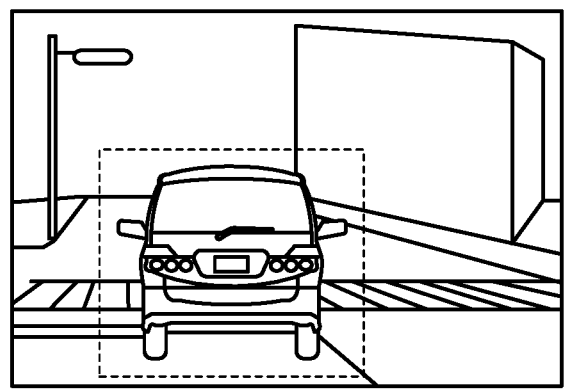
FIG. 4 is a diagram illustrating one example of an image on which the object whose size is "middle" appears.
Figure 5:
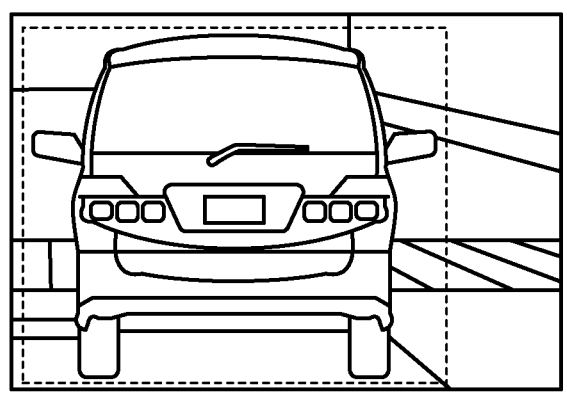
FIG. 5 is a diagram illustrating one example of an image on which the object whose size is "large" appears.

Next, with reference to FIGS. 3, 4, and 5, difference in size of an object will be explained. Assume that the numbers of pixels in images illustrated in FIGS. 3, 4, and 5 are equal to each other.

Figure 3:
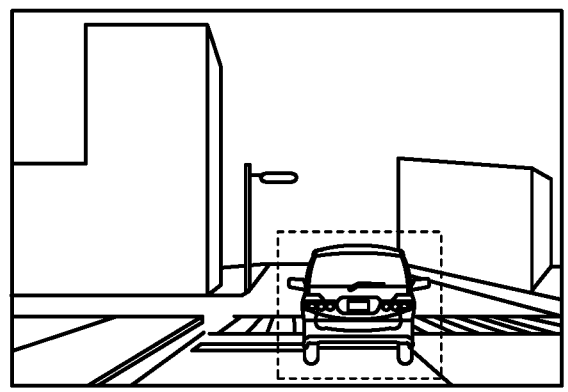
FIG. 3 is a diagram illustrating one example of an image on which an object whose size is "small" appears.

FIG. 3 is a diagram illustrating one example of an image on which an object whose size is "small" appears. FIG. 4 is a diagram illustrating one example of an image on which the object whose size is "middle" appears. FIG. 5 is a diagram illustrating one example of an image on which the object whose size is "large" appears. Rectangular shapes indicated by using dashed lines are bounding boxes.

As described above, even in a case where capturing targets are the same, sizes of objects on images are different from each other in some cases. Needless to say, in a case where capturing targets are different from each other, there also presents a case where sizes of objects on images are different from each other.

The change unit 12b changes, on the basis of a size distribution of object, a layer connected to the detection unit 12d of CNN for detecting an object appearing on an image, among layers for extracting feature included in the CNN.

The connection between a layer and a detector means constituting a model such that a feature extracted in the layer is input to the detector.

Figure 6:
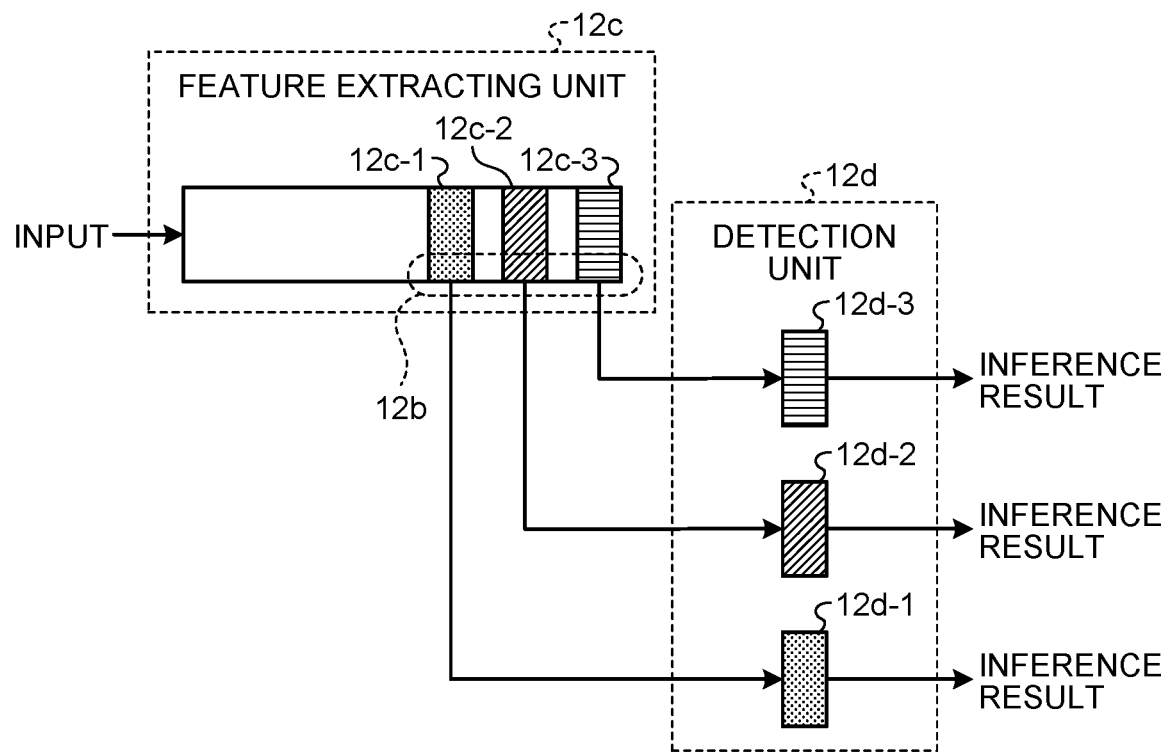
FIG. 6 is a diagram illustrating a configuration example of a model before change.

The change unit 12b applies change to the model illustrated in FIG. 6. FIG. 6 is a diagram illustrating a configuration example of a model before change.

The feature extracting unit 12c is a portion of CNN on an input side. The detection unit 12d is a portion of CNN on an output (inference result) side.

The feature extracting unit 12c may be a part corresponding to a backbone. For example, in a case where CNN includes a fully connected layer, a layer former than the fully connected layer may be the feature extracting unit 12c, and a layer later than the fully connected layer may be the detection unit 12d.

Note that CNN according to the present embodiment may be one without a fully connected layer.

The detection unit 12d includes a plurality of detectors. Each of the detectors receives, as an input, a feature extracted by a corresponding layer of the feature extracting unit 12c, and outputs an inference result.

First, the change unit 12b selects a layer of a connection source. The change unit 12b connects the selected layer to a corresponding detector. Thus, the change unit 12b is capable of changing the number of detectors to be used.

For example, the change unit 12b connects a layer 12c-1 to a detector 12d-1. For example, the change unit 12b connects a layer 12c-2 to a detector 12d-2. For example, the change unit 12b connects a layer 12c-3 to a detector 12d-3.

Herein, the detector 12d-2 is appropriate for detecting an object whose size is small compared with the detector 12d-3. Moreover, the detector 12d-1 is appropriate for detecting an object whose size is small compared with the detector 12d-2.

This is because in the feature extracting unit 12c, a scale of an extracted feature is larger as a layer goes further in an output direction. CNN has a tendency that features of a whole image are extracted in a layer on an output side and features of details of the image are extracted in a layer on an input side.

A feature having a large scale is considered to be appropriate for detection of an object having a large size. On the other hand, a feature having a small scale is considered to be appropriate for detection of an object having a small size.

Thus, the change unit 12b changes a layer to be connected to a detection unit in accordance with a size distribution of an object that is measured by the measurement unit 12a and a scale of a feature amount extracted in each of layers for extracting feature.

Figure 7:
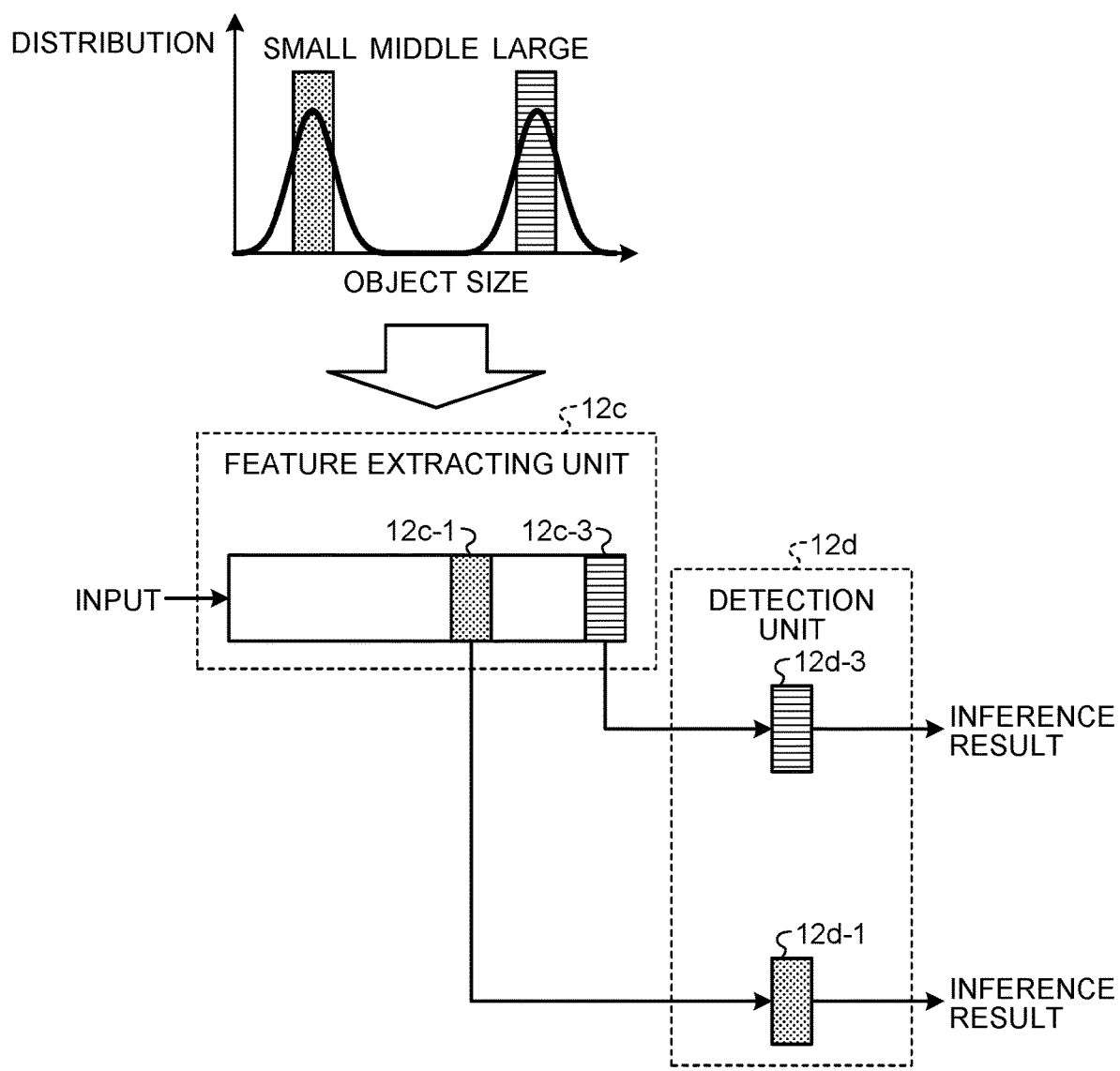
FIG. 7 is a diagram illustrating a configuration example of a model after change.

FIG. 7 is a diagram illustrating a configuration example of a model after change. In the example illustrated in FIG. 7, assume that in a measurement result by the measurement unit 12a, the numbers of objects having "small" and "large" sizes are large and the number of objects having a "middle" size is small in an image of a data set.

In this case, the change unit 12b connects the layer 12c-1 to the detector 12d-1, and further connects the layer 12c-3 to the detector 12d-3.

Figure 8:
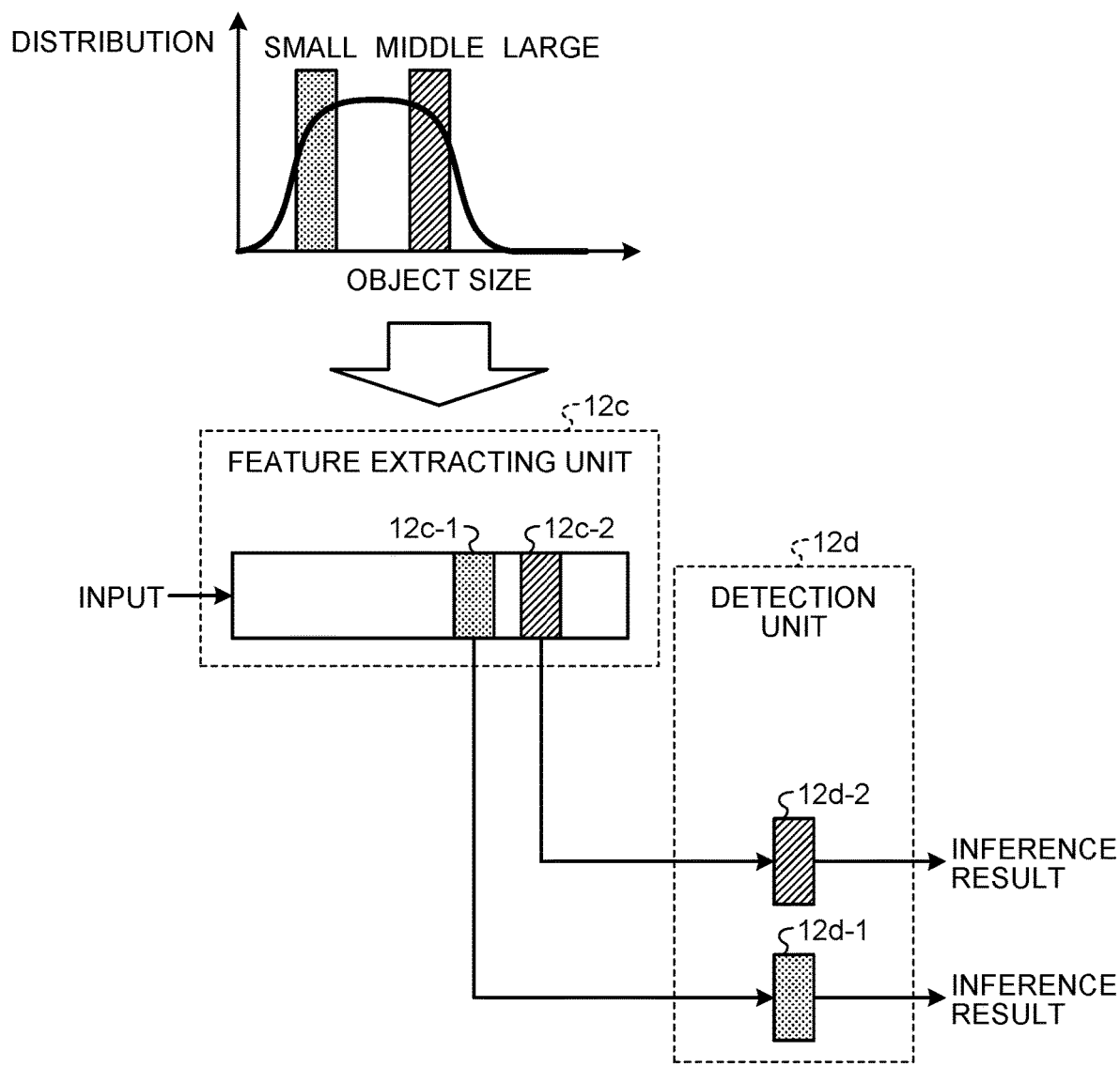
FIG. 8 is a diagram illustrating a configuration example of a model after change.

FIG. 8 is a diagram illustrating a configuration example of a model after change. In the example illustrated in FIG. 8, assume that in a measurement result by the measurement unit 12a, the numbers of objects having "small" and "middle" sizes are large and the number of objects having a "large" size is small in an image of a data set.

In this case, the change unit 12b connects the layer 12c-1 to the detector 12d-1, and further connects the layer 12c-2 to the detector 12d-2.

Moreover, in the example illustrated in FIG. 8, the change unit 12b is capable of removing the layer 12c-3. Thus, the change unit 12b is capable of replacing an operator of CNN in accordance with change in a layer to be connected. Thus, needless calculation is omitted to be able to reduce a calculation amount.

As the examples illustrated in FIGS. 7 and 8, the change unit 12b selects, on the basis of a degree of a size in the measurement result, a predetermined step from among size steps having a predetermined constant number such as "large", "middle", and "small" to be able to connect a layer corresponding to the above-mentioned step to a detector.

For example, with respect to an area of a whole image, a size of less than 10% thereof is defined as "small", a size of equal to or more than 10% and less than 50% thereof is defined as "middle", and a size of equal to or more than 50% thereof is defined as "large". Assume that the change unit 12b selects a step in which a degree of a size of measurement result is equal to or more than 30%.

For example, in a case where among one hundred objects on an image in a data set, the number of sizes of "small" is 30, the number of sizes of "middle" is 10, and the number of sizes of "large" is 40, degrees of "small" and "large" are equal to or more than 30%, and thus the change unit 12b connects layers corresponding to "small" and "large" to a detector.

For example, in a case where among one hundred objects on an image in a data set, the number of sizes of "small" is 50, the number of sizes of "middle" is 50, and the number of sizes of "large" is zero, degrees of "small" and "middle" are equal to or more than 30%, and thus the change unit 12b connects layers corresponding to "small" and "middle" to a detector.

The updating unit 12e updates a parameter of a model on the basis of an inference result by the model. Learning of a model is realized by the updating unit 12e.

For example, with respect to a label associated with each of images, the updating unit 12e updates a parameter of the corresponding model such that a score calculated by the model is maximized.

The updating unit 12e updates a parameter of a model generated by the change unit 12b. For example, in the example illustrated in FIG. 8, the updating unit 12e updates parameters of the layer 12c-1, the layer 12c-2, the detector 12d-2, and the detector 12d-1.

In the example illustrated in FIG. 8, the updating unit 12e does not need to update parameters of the layer 12c-3 and the detector 12d-3. As described above, in the present embodiment, a configuration of a model is previously changed, so that a processing amount related to leaning is able to be reduced.

Figure 9:
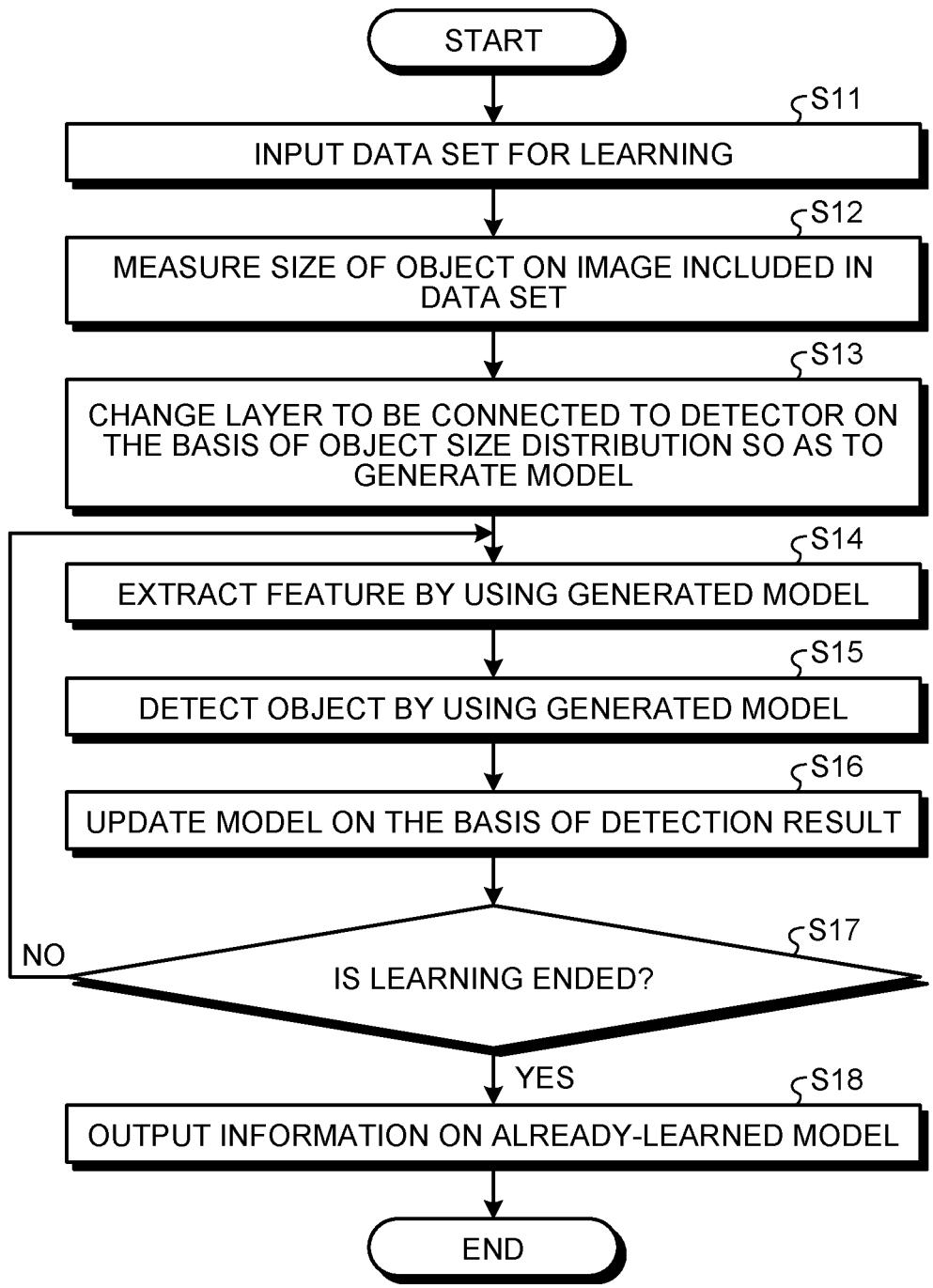
FIG. 9 is a flowchart illustrating a processing procedure to be executed by the model generating apparatus according to the embodiment.

Next, a processing procedure to be executed by the model generating apparatus according to the embodiment will be explained with reference to FIG. 9. FIG. 9 is a flowchart illustrating the processing procedure to be executed by the model generating apparatus according to the embodiment.

As illustrated in FIG. 9, first, the model generating apparatus 10 receives an input of a data set for learning (Step S11). Next, the model generating apparatus 10 measures a size of an object on an image included in the data set (Step S12). Moreover, the model generating apparatus 10 executes statistical processing on the measured values so as to obtain an object size distribution.

Herein, the model generating apparatus 10 changes a layer to be connected to a detector on the basis of the object size distribution so as to generate a model (Step S13).

The model generating apparatus 10 extracts a feature by using the generated model (Step S14). Moreover, the model generating apparatus 10 detects an object by using the generated model (Step S15).

A detector to be used in Step S15 is decided in accordance with a configuration of the model generated in Step S13.

The model generating apparatus 10 updates the model on the basis of detection result (Step S16). Specifically, the model generating apparatus 10 updates a parameter of the model generated in Step S13.

When ending the learning (Step S17: Yes), the model generating apparatus 10 outputs information on an already-learned model (Step S18). On the other hand, when not ending the learning (Step S17: No), the model generating apparatus 10 returns the processing to Step S14 so as to repeat the processing.

For example, in a case where the processing is repeated for a predetermined number of times and an update amount of parameter has converged, the model generating apparatus 10 is capable of determining to end the learning.

(Data Collecting System)

For one example, a model generated by the model generating apparatus 10 is used in a data collecting system that collects data from vehicles.

Figure 10:
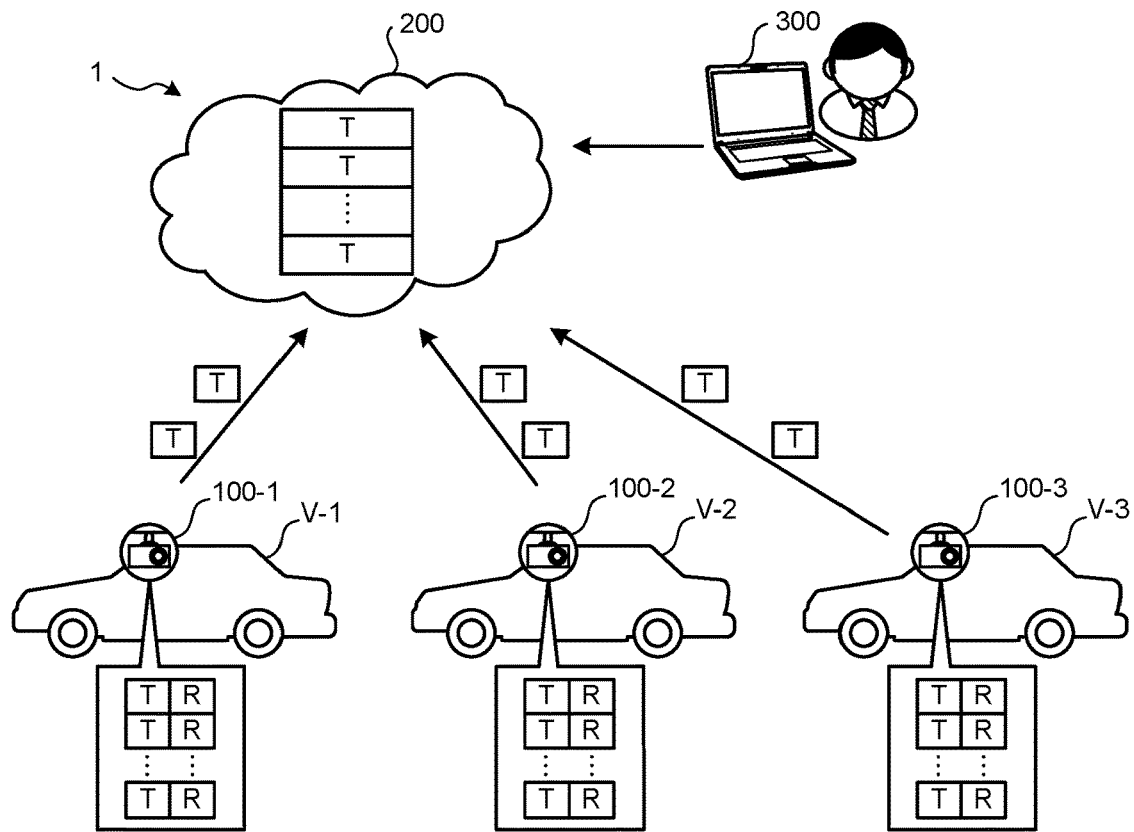
FIG. 10 is a diagram illustrating the outline of a data collecting system according to the embodiment.
Figure 11:
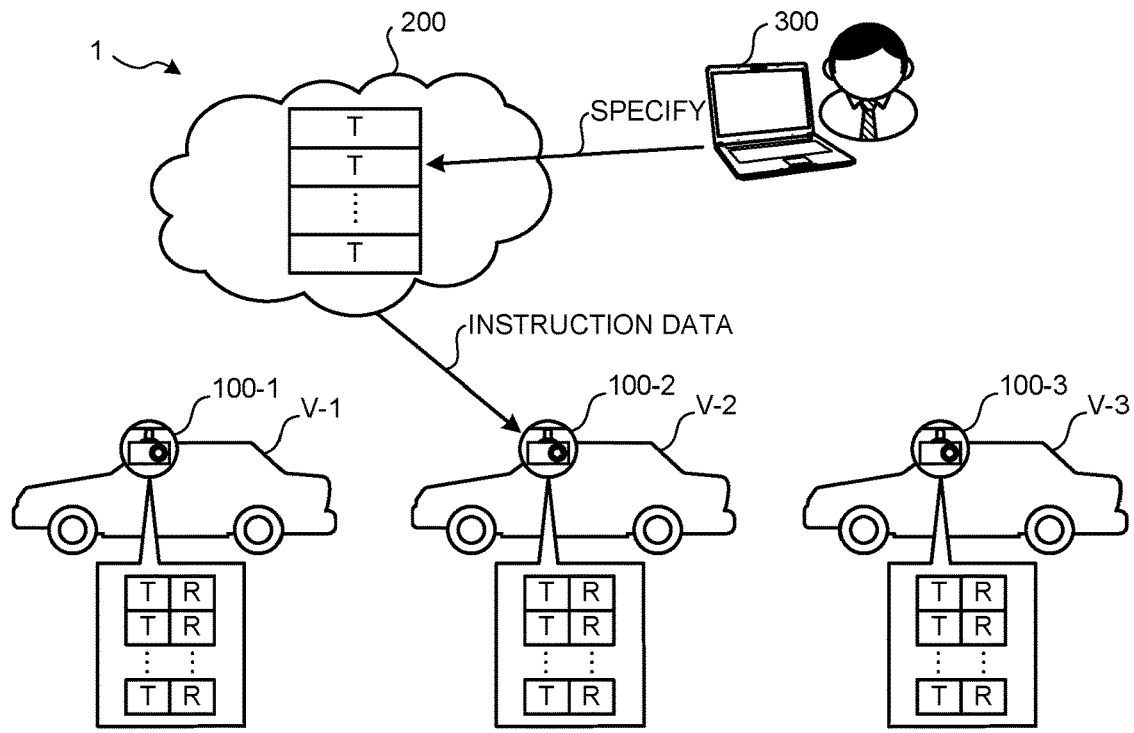
FIG. 11 is a diagram illustrating the outline of the data collecting system according to the embodiment.
Figure 12:
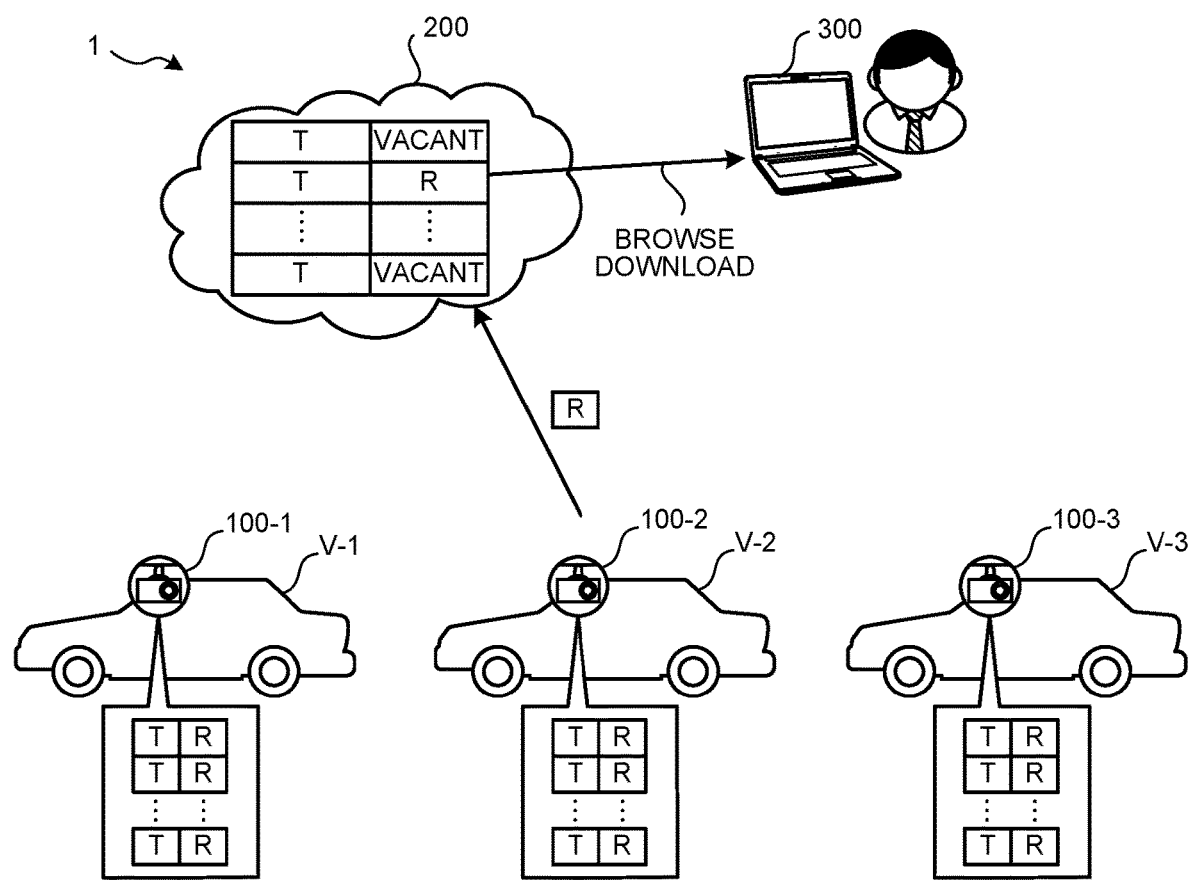
FIG. 12 is a diagram illustrating the outline of the data collecting system according to the embodiment.
Figure 13:
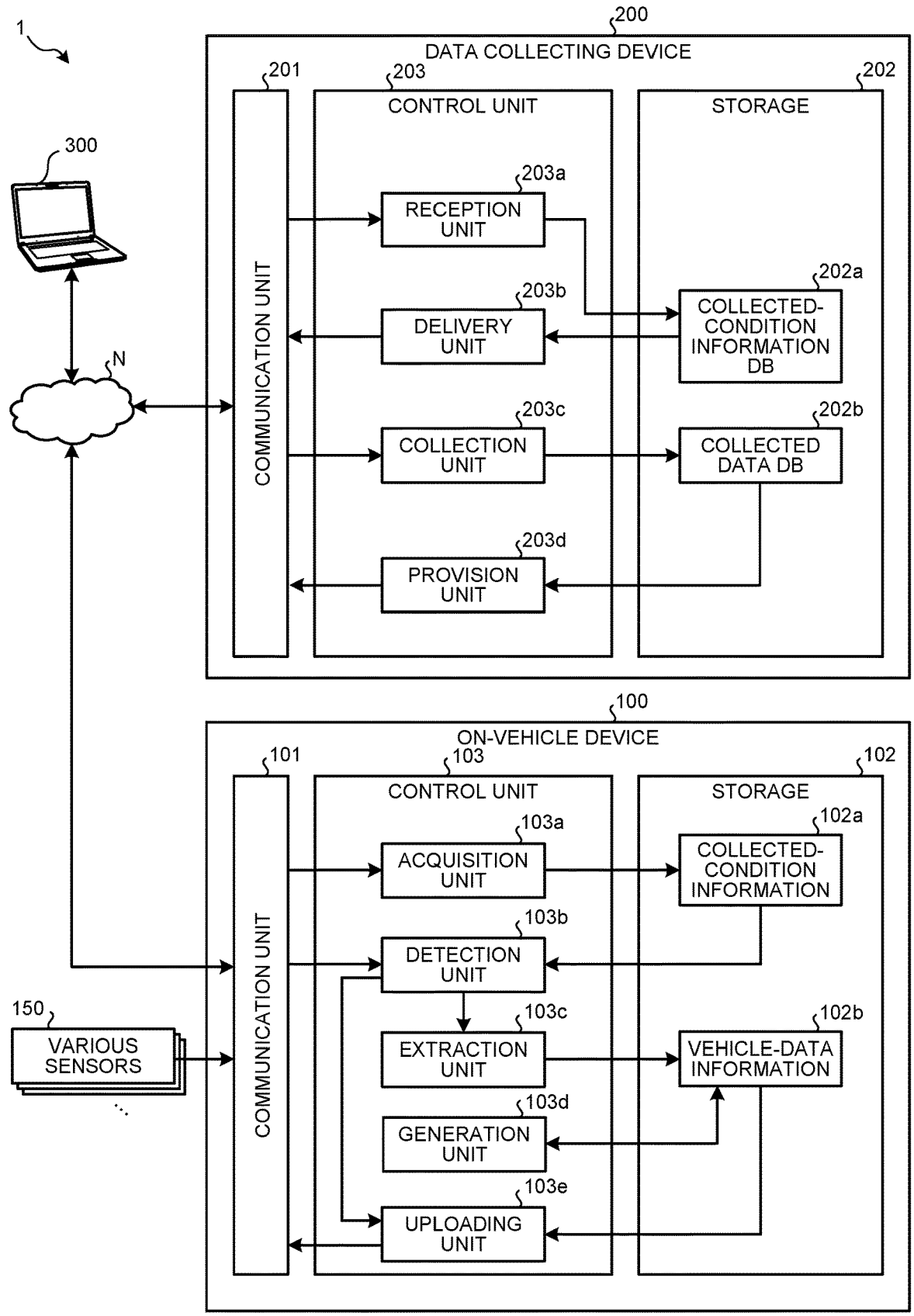
FIG. 13 is a block diagram illustrating a configuration example of the data collecting system according to the embodiment.

A data collecting system according to the embodiment will be explained with reference to FIGS. 10 to 13. FIGS. 10 to 12 are diagrams illustrating the outline of the data collecting system according to the embodiment. FIG. 13 is a block diagram illustrating a configuration example of the data collecting system according to the embodiment.

As illustrated in FIG. 10, a data collecting system 1 according to the embodiment includes a data collecting device 200, on-vehicle devices 100-1, 100-2, 100-3, . . . , that are mounted on respective vehicles V-1, V-2, V-3, . . . , and a user terminal 300.

Hereinafter, when generally indicating a vehicle, the vehicle may be referred to as "vehicle V", and when generally indicating an on-vehicle device, the on-vehicle device may be referred to as "on-vehicle device 100".

Hereinafter, the vehicles V are autonomous driving vehicles, and autonomous driving control is executed thereon by vehicle controlling models respectively mounted on the vehicles V; however, not limited thereto. In other words, the vehicles V may include a vehicle on which autonomous driving control is not executed.

The data collecting device 200 is configured as a cloud server that provides cloud service via a network such as the Internet and a mobile telephone network.

The data collecting device 200 receives, from a data user, a collection request for data (hereinafter, may be referred to as vehicle data) related to the vehicles V, and further collects vehicle data from each of the on-vehicle devices 100 on the basis of the received collection request.

The data collecting device 200 provides, to a user, the collected vehicle data.

The on-vehicle device 100 includes various sensors such as a camera, an acceleration sensor, a Global Positioning System (GPS) sensor, a vehicle-speed sensor, an accelerator sensor, a brake sensor, and an operated wheel-angle sensor; a storage device, a microcomputer, etc.

The on-vehicle device 100 acquires a collection request that is received by the data collecting device 200, and further acquires vehicle data according to the collection request from the vehicle V.

The above-mentioned camera is capable of capturing the periphery of the vehicle V so as to output an image, for example. The image may be a still image or a video.

The acceleration sensor detects an acceleration working on the vehicle V, and the GPS sensor detects a location of the vehicle V. The vehicle-speed sensor detects a vehicle speed of the vehicle V. The accelerator sensor detects an operation amount of an accelerator pedal, and the brake sensor detects an operation amount of a brake pedal.

The operated wheel-angle sensor detects a steering angle of a steering wheel of the vehicle V. For example, a dashboard camera may be employed for the on-vehicle device 100.

The on-vehicle device 100 appropriately uploads the acquired vehicle data to the data collecting device 200.

As described above, the dashboard camera is also used as the on-vehicle device 100, so that it is possible to optimize on-vehicle components mounted on the vehicle V. Note that the on-vehicle device 100 and a dashboard camera may be separately configured without using one also as the other.

The user terminal 300 is a terminal that is used by a data user, such as a personal computer, a tablet terminal, a smartphone, and a wearable device.

In the data collecting system 1 according to the embodiment, on the basis of a collection condition specified via the user terminal 300, the data collecting device 200 is capable of collecting vehicle data from the on-vehicle devices 100, and further providing the collected vehicle data to the user terminal 300.

Moreover, a data user of the user terminal 300 uses the provided vehicle data to be able to analyze, for example, behaviors of the vehicles V from which pieces of vehicle data are collected and events occurred on the vehicles V.

Hereinafter, with reference to FIGS. 10 to 13, a series of processes until vehicle data is provided to a data user in the data collecting system 1 will be explained.

As illustrated in FIG. 10, first, a data user specifies a collection condition by using the user terminal 300 connected to the data collecting device 200.

Herein, the above-mentioned collection condition includes various parameters such as a condition to be a collection trigger. For example, a condition to be a collection trigger is a change from a state where autonomous driving is executed in the vehicle V into a state where the autonomous driving is released.

When a collection condition is specified, the data collecting device 200 generates data for generating tag data T that is index data that is to be added to actual data R (one example of vehicle data) to be collected, and that is used in searching and grasping the outline of the actual data R.

In other words, the tag data T is metadata obtained by changing the actual data R into meta information. Data for generating the tag data T is generated on the basis of operation of a data user while using a program and/or data for generation stored in the user terminal 300 or the data collecting device 200.

The specified collection condition and the generated data for generating the tag data T are stored in the data collecting device 200, and are delivered to the vehicle V to be a data collection target so as to be also stored in the on-vehicle device 100.

Next, each of the on-vehicle devices 100 monitors output data of various sensors, and when an event that satisfies a stored collection condition (herein, release of autonomous driving, for example) occurs, stores the actual data R such as the output data and images in a storage device.

Incidentally, a data capacity of images is comparatively large, for example, and thus if all images are transmitted from the on-vehicle device 100 to the data collecting device 200, there presents possibility that communication load between the on-vehicle device 100 and the data collecting device 200 and processing load of the data collecting device 200 are increased.

Thus, in the present embodiment, a configuration is employed that is capable of reducing communication load between the on-vehicle device 100 and the data collecting device 200, and processing load of the data collecting device 200.

In other words, the on-vehicle device 100 stores, in a storage device, an image and a label provided to the image in association with each other.

Assume that a label of an image is detected by a model that is output from the model generating apparatus 10. In other words, the actual data R includes an image. Furthermore, the tag data T includes a label related to the image.

Note that the data collecting device 200 may have function that is equivalent to that of the model generating apparatus 10. In this case, the data collecting device 200 is capable of delivering, to the on-vehicle device 100, the model information 10b related to an already-learned model.

In the present embodiment, the data collecting device 200 first collects the tag data T and provides the collected tag data T to the user terminal 300, and in a case where receiving a provision request for an image from the user terminal 300, collects images from the on-vehicle device 100 and provides the collected image to the user terminal 300.

Each of the on-vehicle devices 100 generates, on the basis of stored data for generating the tag data T and the stored actual data R, the tag data T corresponding to the above-mentioned actual data R and stores therein the generated tag data T.

Each of the on-vehicle devices 100 uploads the tag data T to the data collecting device 200, and the data collecting device 200 stores therein the uploaded tag data T.

In this case, the actual data R is not uploaded to the data collecting device 200. In other words, as illustrated in FIG. 10, the data collecting device 200 is in a state of storing therein the tag data T alone.

When a data user connects the user terminal 300 to the data collecting device 200 in order to recognize a collection situation or to collect the actual data R, meta information based on the tag data T collected by the data collecting device 200 is displayed on the user terminal 300.

As illustrated in FIG. 11, when a data user specifies the tag data T corresponding to the actual data R to be collected by using the user terminal 300, instruction data is transmitted that specifies the actual data R to the corresponding on-vehicle device 100 via the data collecting device 200.

Next, as illustrated in FIG. 12, the specified actual data R is uploaded from each of the on-vehicle devices 100 to the data collecting device 200, and is collected and stored in the data collecting device 200.

The data user accesses the actual data R stored in the data collecting device 200 by using the user terminal 300 so as to browse or download the actual data R and/or the tag data T, for example.

Hereinafter, a configuration example of the data collecting system 1 according to the embodiment will be more specifically explained.

FIG. 13 is a block diagram illustrating a configuration example of the data collecting system according to the embodiment. Note that in FIG. 13, configuration elements for explaining features of the embodiment alone are indicated, and explanation of general configuration elements is omitted.

In explanation with reference to FIG. 13, explanation of already-explained configuration elements may be simplified or omitted.

As illustrated in FIG. 13, the data collecting system 1 according to the embodiment includes the data collecting device 200, the on-vehicle device 100, and the user terminal 300.

First, the data collecting device 200 will be explained. The data collecting device 200 includes a communication unit 201, a storage 202, and a control unit 203.

The communication unit 201 realized by a Network Interface Card (NIC) and the like, for example. The communication unit 201 is connected to a network N in a wired or wireless manner, and transmits and receives information to and from the on-vehicle device 100 and the user terminal 300 via the network N.

The storage 202 is realized by a semiconductor memory element such as a RAM and a flash memory; or a storage such as a hard disk and an optical disk, and in the example illustrated in FIG. 13, stores therein a collected-condition information DB 202a and a collected data DB 202b.

The collected-condition information DB 202a is specified from the user terminal 300, and a collection condition received by a reception unit 203a to be mentioned later is accumulated therein. In other words, the collected-condition information DB 202a includes past actual results related to a collection condition.

A collection condition includes various parameters related to collection of vehicle data. For example, various parameters include an identifier of the target vehicle V, a type of data to be collected, a condition to be a collection trigger, a time interval of collection, and the like.

The collected data DB 202b accumulates therein collected data collected from each of the on-vehicle devices 100 by using a collection unit 203c to be mentioned later. In other words, the collected data DB 202b includes past actual results of collected data. Furthermore, the collected data includes the above-mentioned tag data T, the above-mentioned actual data R, and the like.

Figures 14, 15:
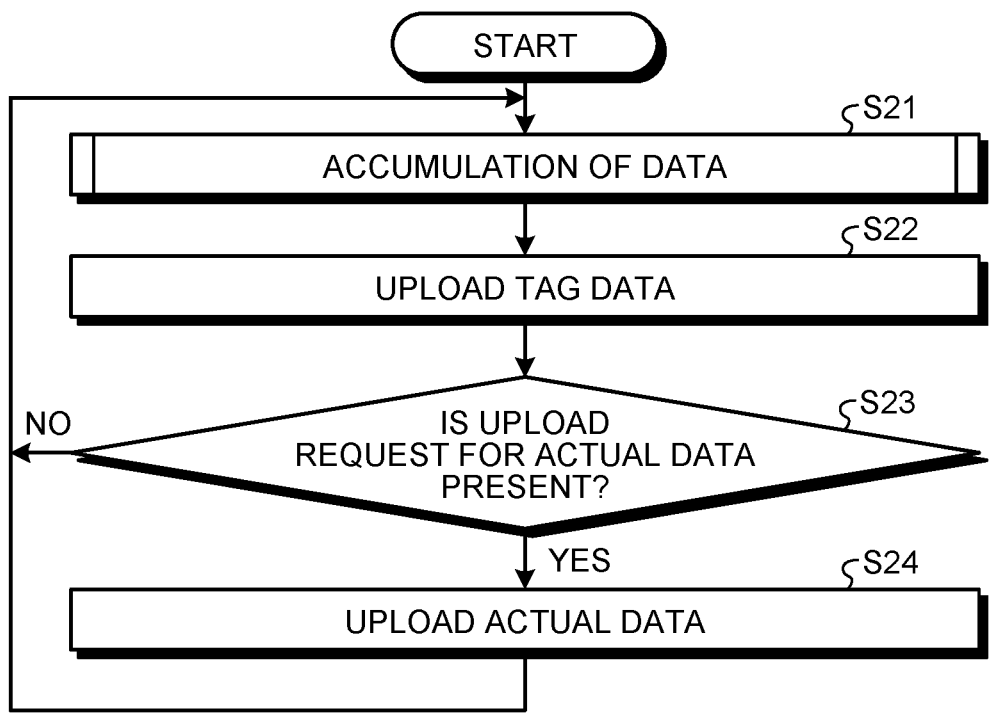
FIG. 14 is a diagram illustrating one example of collected data.
FIG. 15 is a flowchart illustrating a processing procedure to be executed by an on-vehicle device according to the embodiment.

Herein, with reference to FIG. 14, collected data stored in the collected data DB 202b will be explained. FIG. 14 is a diagram illustrating one example of collected data. As illustrated in FIG. 14, collected data includes items such as "tag ID", "vehicle ID", "capturing date and hour", and "inference result".

The "tag ID" is identification information that identifies the tag data T. The "vehicle ID" is identification information that identifies the vehicle V. The "capturing date and hour" is a date and an hour at which an image is captured. The "inference result" is a detection result by a model, and further is a label whose score is the highest.

Returning to explanation of FIG. 13, the control unit 203 is a controller, and various programs stored in a storage device in the data collecting device 200 are executed by a CPU, an MPU, etc. by using a RAM as a work region so as to realize the control unit 203, for example.

The control unit 203 may be realized by an integrated circuit such as an ASIC and an FPGA.

The control unit 203 includes the reception unit 203a, a delivery unit 203b, the collection unit 203c, and a provision unit 203d so as to realize and execute functions and actions of information processing to be mentioned later.

The reception unit 203a receives a collection condition via the communication unit 201, which is specified by a data user via the user terminal 300, and informs the delivery unit 203b of the received collection condition. The reception unit 203a stores the collection condition specified by the data user in the collected-condition information DB 202a.

The reception unit 203a is capable of receiving, from the user terminal 300, a provision request for the actual data R corresponding to the tag data T, and further informing the collection unit 203c of the received provision request.

The delivery unit 203b delivers, to the vehicle V to be a target vehicle via the communication unit 201, a collection condition that is stored in the collected-condition information DB 202a and that is specified by a data user in a file format, for example.

The collection unit 203c collects, via the communication unit 201, the tag data T and/or the actual data R that are vehicle data acquired on the basis of a collection condition delivered from the delivery unit 203b and that are uploaded from the on-vehicle device 100, and accumulates, as collected data, the data in the collected data DB 202b.

For example, the collection unit 203c collects the tag data T from the on-vehicle device 100, and accumulates the collected data in the collected data DB 202b.

In the present embodiment, a label whose data capacity is smaller than that of an image is collected as the tag data T, so that it is possible to reduce communication load between the on-vehicle device 100 and the data collecting device 200 and further to reduce processing load of the data collecting device 200, for example.

When receiving a provision request by using the reception unit 203a, the collection unit 203c collects the actual data R corresponding to the tag data T from the on-vehicle device 100, and further accumulates the collected data in the collected data DB 202b.

The provision unit 203d provides, to the user terminal 300, the collected data accumulated in the collected data DB 202b, for example. The provision unit 203d provides, to the user terminal 300, the specified actual data R and the tag data T associated with the actual data R, for example.

Next, the on-vehicle device 100 will be explained. The on-vehicle device 100 includes a communication unit 101, a storage 102, and a control unit 103. As described above, various sensors 150 such as a camera, an acceleration sensor, and a GPS sensor are connected to the on-vehicle device 100.

Similarly to the communication unit 201, the communication unit 101 is realized by NIC and the like, for example.

The communication unit 101 is wirelessly connected to the network N, and transmits and receives information to and from the data collecting device 200 via the network N. Furthermore, the communication unit 101 receives output data from the various sensors 150.

Similarly to the storage 202, the storage 102 is realized by a semiconductor memory element such as a RAM and a flash memory, or a storage such as a hard disk and an optical disk, and in the example illustrated in FIG. 13, stores therein collected-condition information 102a and vehicle-data information 102b.

The collected-condition information 102a is information that includes a collection condition delivered from the data collecting device 200. The vehicle-data information 102b is information that includes vehicle data extracted by an extraction unit 103c to be mentioned later. Note that vehicle data includes the above-mentioned tag data T, the above-mentioned actual data R, and the like.

Similarly to the control unit 203, the control unit 103 is a controller, and various programs stored in a storage device in the on-vehicle device 100 are executed by a CPU, an MPU, etc. by using a RAM as a work region so as to realize the control unit 103, for example.

The control unit 103 may be realized by an integrated circuit such as an ASIC and an FPGA.

The control unit 103 includes an acquisition unit 103*a*, a detection unit 103*b*, the extraction unit 103*c*, a generation unit 103*d*, and an uploading unit 103*e* so as to realize or execute functions and actions of information processing to be mentioned later.

The acquisition unit 103*a* acquires a collection condition, which is delivered from the data collecting device 200, and further stores the acquired collection condition in the collected-condition information 102*a*. The detection unit 103*b* monitors output data transmitted from the various sensors 150, and further detects occurrence of an event to be a trigger under the collection condition.

For example, when detecting occurrence of an event to be a trigger for extracting vehicle data under the collection condition (in this case, autonomous driving is released), the detection unit 103*b* causes the extraction unit 103*c* to extract vehicle data.

For example, when detecting occurrence of an event to be a trigger for uploading vehicle data to the data collecting device 200 under the collection condition, the detection unit 103*b* causes the uploading unit 103*e* to upload vehicle data.

When the detection unit 103*b* detects occurrence of a trigger for extracting vehicle data, the extraction unit 103*c* extracts vehicle data based on output data of the various sensors 150, and further stores the extracted data in the vehicle-data information 102*b*.

The vehicle data includes an image. When the detection unit 103*b* detects occurrence of a trigger for stopping extraction of vehicle data, the extraction unit 103*c* stops extraction of vehicle data.

The generation unit 103*d* generates a label to be provided to an image by using a model that is constructed with the use of the already-learned model information 10*b* output from the model generating apparatus 10. Note that an image is a piece of vehicle data extracted by the extraction unit 103*c*.

The generation unit 103*d* includes function that is equivalent to those of the feature extracting unit 12*c* and the detection unit 12*d* of the model generating apparatus 10. Thus, the generation unit 103*d* is capable of obtaining a label as an inference result.

Thus, the generation unit 103*d* is capable of generating, as the tag data T, a label according to an image that is the actual data R.

According to the present embodiment, it is possible to preliminary prepare, in response to a user request and the like, a model according to a size of an object to be detected by the data collecting system 1.

In a case where the detection unit 103*b* detects occurrence of a trigger for uploading vehicle data, the uploading unit 103*e* uploads (transmits) vehicle data stored in the vehicle-data information 102*b* to the data collecting device 200. Note that the uploading unit 103*e* is one example of a transmitting unit.

For example, the uploading unit 103*e* is capable of uploading, to the data collecting device 200, the tag data T including a label that is generated by the generation unit 103*d*.

When receiving a provision request of an image corresponding to the label, the uploading unit 103*e* is capable of uploading an extracted image to the data collecting device 200.

With reference to FIG. 15, a processing procedure to be executed by an on-vehicle device according to the embodiment will be explained. FIG. 15 is a flowchart illustrating the processing procedure to be executed by the on-vehicle device according to the embodiment.

The on-vehicle device 100 accumulates therein data (Step S21). Specifically, the on-vehicle device 100 accumulates therein an image captured by a camera and a label of the image as actual data and tag data, respectively.

The on-vehicle device 100 uploads tag data (Step S22). Herein, when there presents an upload request for actual data (Step S23: Yes), the on-vehicle device 100 uploads actual data (Step S24), and returns the processing to Step S21.

On the other hand, when there presents no upload request for actual data (Step S23: No), the on-vehicle device 100 returns the processing to Step S21 without uploading actual data.

Figure 16:
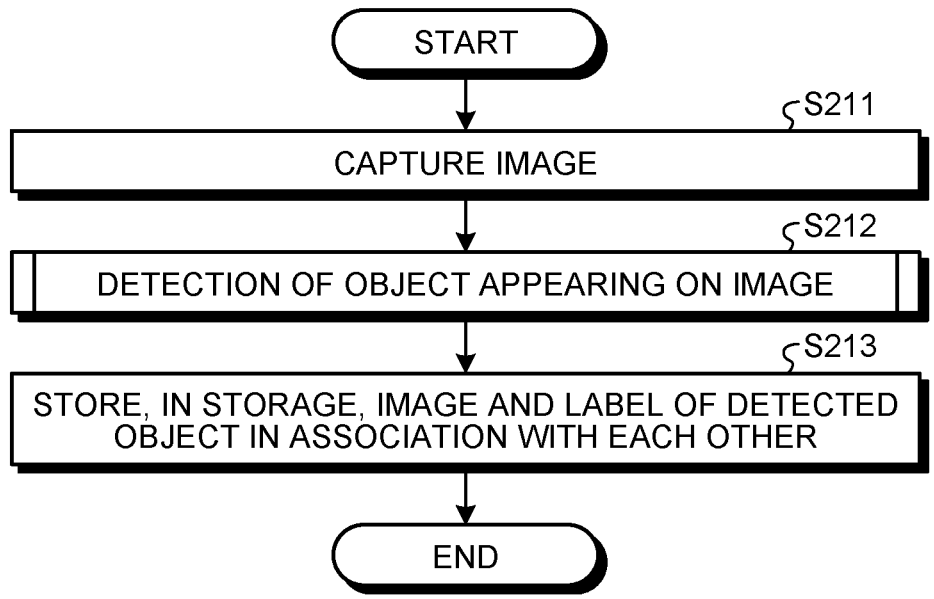
FIG. 16 is a flowchart illustrating a processing procedure for accumulating data.

Next, with reference to FIG. 16, details of the process (Step S21 illustrated in FIG. 15) for accumulating data will be explained. FIG. 16 is a flowchart illustrating the processing procedure for accumulating data.

As illustrated in FIG. 16, first, the on-vehicle device 100 captures an image (Step S211). The on-vehicle device 100 detects an object appearing on an image (Step S212). Details of Step S212 will be mentioned later with reference to FIG. 17.

Herein, the on-vehicle device 100 stores, in a storage, the image and a label of the detected object in association with each other (Step S213).

Figure 17:
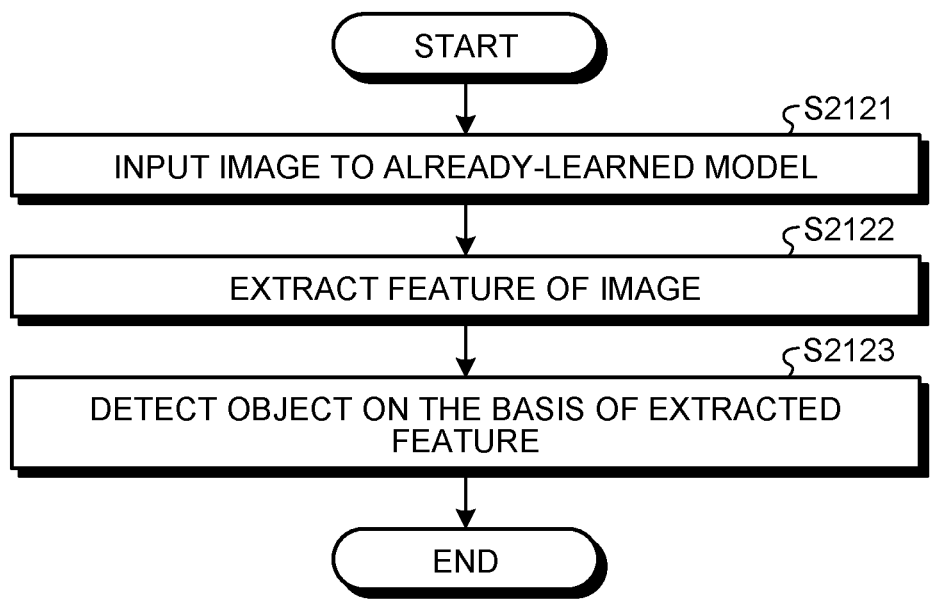
FIG. 17 is a flowchart illustrating a processing procedure for detecting an object.

With reference to FIG. 17, details of the process (Step S212 illustrated in FIG. 16) for detecting an object appearing on an image will be explained. FIG. 17 is a flowchart illustrating the processing procedure for detecting an object.

As illustrated in FIG. 17, first, the on-vehicle device 100 inputs an image to an already-learned model (Step S2121). Next, the on-vehicle device 100 extracts a feature of the image (Step S2122), and further detects an object on the basis of the extracted feature (Step S2123).

The already-learned model used in the process illustrated in FIG. 17 is constructed on the basis of the model information 10*b* that is output from the above-mentioned model generating apparatus 10.

Step S2122 illustrated in FIG. 17 corresponds to Step S14 illustrated in FIG. 9. Step S2123 illustrated in FIG. 17 corresponds to Step S15 illustrated in FIG. 9.

As described above, the model generating apparatus 10 according to the embodiment includes the measurement unit 12*a* and the change unit 12*b*. The measurement unit 12*a* measures a size of an object appearing on an image included in a data set. The change unit 12*b* changes, based on a distribution of the size, a layer to be connected to the detection unit 12*d* of a Convolutional Neural Network (CNN) for detecting an object appearing on the image, among layers for extracting feature included in the CNN. Thus, according to the present embodiment, it is possible to dynamically change a configuration of a model in accordance with an image to be detected.

According to the embodiment, a configuration of a model is able to be lean one depending on the application, so that it is possible to reduce usage of a CPU and a memory. The above-mentioned fact is particularly effective on automotive application requiring miniaturization and lower power consumption, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Figure 18:
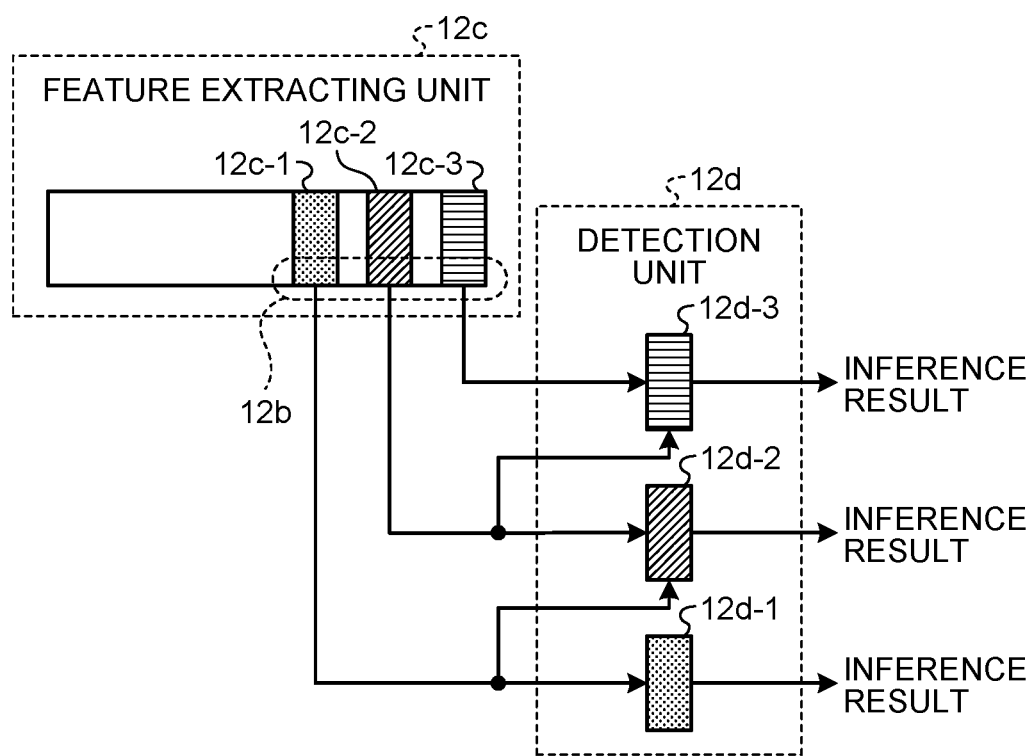
FIG. 18 is a diagram illustrating a configuration example of a model before change.

For example, a model before change may have a configuration illustrated in FIG. 18, for example. FIG. 18 is a diagram illustrating a configuration example of a model before change. In the example illustrated in FIG. 18, the detector 12*d*-2 is connected not only to the layer 12*c*-2, but also to the layer 12*c*-1.

As described above, each detector may employ a feature that is extracted from a layer whose feature scale is smaller than that of a corresponding layer to be able to improve detection accuracy.

The invention claimed is:

1. A model generating apparatus comprising:
a processor configured to:
measure sizes of a plurality of objects identified in an image included in data set;
calculate a distribution of the sizes for the plurality of objects;
select fewer number of layers among a plurality of layers for extracting features in a Convolutional Neural Network (CNN), based on the distribution; and
connect the fewer number of layers to a detector for detecting the plurality of objects.

2. The model generating apparatus according to claim 1, wherein
the processor is further configured to:
change a layer to be connected to the detector in accordance with a distribution of the sizes and a scale of a feature amount that is extracted from each of the layers for extracting feature.

3. The model generating apparatus according to claim 1, wherein
the processor is further configured to:
replace an operator of the CNN in accordance with change in the layer to be connected.

4. The model generating apparatus according to claim 1, wherein
the processor is further configured to:
measure, as a size of each of the plurality of objects, a size of a bounding box obtained from a predetermined process executed on the image.

5. A model generating method to be executed by a model generating apparatus comprising:
measuring sizes of a plurality of objects identified in an image included in data set;
calculating a distribution of the sizes for the plurality of objects;
selecting fewer number of layers among a plurality of layers for extracting features in a Convolutional Neural Network (CNN), based on the distribution; and
connecting the fewer number of layers to a detector for detecting the plurality of objects.

* * * * *